(12) United States Patent
Shanbhogue et al.

(10) Patent No.: US 10,262,162 B2
(45) Date of Patent: *Apr. 16, 2019

(54) CONTROL TRANSFER TERMINATION INSTRUCTIONS OF AN INSTRUCTION SET ARCHITECTURE (ISA)

(71) Applicant: Intel Corporation, Santa Clara, CA (US)

(72) Inventors: Vedvyas Shanbhogue, Austin, TX (US); Jason W. Brandt, Austin, TX (US); Uday Savagaonkar, Portland, OR (US); Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/635,294

(22) Filed: Jun. 28, 2017

(65) Prior Publication Data
US 2017/0293775 A1    Oct. 12, 2017

Related U.S. Application Data

(63) Continuation of application No. 13/690,221, filed on Nov. 30, 2012, now Pat. No. 9,703,567.

(51) Int. Cl.
| G06F 9/30 | (2018.01) |
| G06F 21/71 | (2013.01) |
| G06F 9/38 | (2018.01) |
| G06F 21/52 | (2013.01) |

(52) U.S. Cl.
CPC .......... *G06F 21/71* (2013.01); *G06F 9/30054* (2013.01); *G06F 9/30076* (2013.01); *G06F 9/30145* (2013.01); *G06F 9/3851* (2013.01); *G06F 9/3857* (2013.01); *G06F 9/3861* (2013.01); *G06F 21/52* (2013.01); *G06F 9/3005* (2013.01); *G06F 9/3012* (2013.01)

(58) Field of Classification Search
None
See application file for complete search history.

(56) References Cited

U.S. PATENT DOCUMENTS

| 5,826,055 | A  | 10/1998 | Wang et al. |
| 6,996,677 | B2 | 2/2006  | Lee et al. |
| 7,581,089 | B1 | 8/2009  | White |
| 8,434,073 | B1 | 4/2013  | Satish |
| 8,468,600 | B1 | 6/2013  | Kaskel |
| 8,555,077 | B2 | 10/2013 | Davis et al. |
| 8,688,980 | B2 | 4/2014  | Davis et al. |
| 8,689,350 | B2 | 4/2014  | Davis et al. |
| 8,713,704 | B2 | 4/2014  | Davis et al. |

(Continued)

FOREIGN PATENT DOCUMENTS

| EP | 2867843 | 5/2015 |
| WO | 2014005067 | 1/2014 |

*Primary Examiner* — William B Partridge
(74) *Attorney, Agent, or Firm* — Trop, Pruner & Hu, P.C.

(57) ABSTRACT

In an embodiment, the present invention includes a processor having an execution logic to execute instructions and a control transfer termination (CTT) logic coupled to the execution logic. This logic is to cause a CTT fault to be raised if a target instruction of a control transfer instruction is not a CTT instruction. Other embodiments are described and claimed.

20 Claims, 11 Drawing Sheets

(56) References Cited

U.S. PATENT DOCUMENTS

| | | |
|---|---|---|
| 8,813,085 B2 | 8/2014 | Glew et al. |
| 8,869,241 B2 | 10/2014 | Davis et al. |
| 8,930,714 B2 | 1/2015 | Glew et al. |
| 8,955,111 B2 | 2/2015 | Glew et al. |
| 9,015,860 B2 | 4/2015 | Davis et al. |
| 9,083,687 B2 | 7/2015 | Davis et al. |
| 9,098,608 B2 | 8/2015 | Glew et al. |
| 9,170,843 B2 | 10/2015 | Glew et al. |
| 9,298,900 B2 | 3/2016 | Davis et al. |
| 9,348,985 B2 | 5/2016 | Davis et al. |
| 9,443,085 B2 | 9/2016 | Glew et al. |
| 9,703,567 B2 * | 7/2017 | Shanbhogue ....... G06F 9/30145 |
| 9,943,313 B2 | 4/2018 | Jones et al. |
| 2003/0097587 A1 | 5/2003 | Gulick |
| 2007/0136565 A1 | 6/2007 | Lambrache et al. |
| 2009/0077544 A1 | 3/2009 | Wu |
| 2012/0167120 A1 | 6/2012 | Hentunen |
| 2013/0024676 A1 | 1/2013 | Glew et al. |
| 2013/0024867 A1 | 1/2013 | Glew et al. |
| 2013/0024939 A1 | 1/2013 | Glew et al. |
| 2013/0036464 A1 | 2/2013 | Glew et al. |
| 2013/0081043 A1 | 3/2013 | Glew et al. |
| 2013/0133054 A1 | 5/2013 | Davis et al. |
| 2013/0151515 A1 | 6/2013 | Davis et al. |
| 2013/0151617 A1 | 6/2013 | Davis et al. |
| 2013/0159217 A1 | 6/2013 | Davis et al. |
| 2013/0159413 A1 | 6/2013 | Davis et al. |
| 2013/0160087 A1 | 6/2013 | Davis et al. |
| 2013/0160121 A1 | 6/2013 | Yazdani |
| 2013/0191887 A1 | 7/2013 | Davis et al. |
| 2013/0197968 A1 | 8/2013 | Davis et al. |
| 2014/0123249 A1 | 5/2014 | Davis et al. |
| 2015/0020075 A1 | 1/2015 | Glew et al. |
| 2015/0128262 A1 | 5/2015 | Glew et al. |

* cited by examiner

1

CONTROL TRANSFER TERMINATION INSTRUCTIONS OF AN INSTRUCTION SET ARCHITECTURE (ISA)

This application is a continuation of U.S. patent application Ser. No. 13/690,221, filed Nov. 30, 2012, the content of which is hereby incorporated by reference.

BACKGROUND

Return-oriented programming (ROP) is a computer security exploit technique in which an attacker uses software control of a stack to execute an attacker-chosen sequence of machine instructions. These clusters of instructions typically end with a programmer-intended or unintended return (RET) instruction within existing program code. The intended or unintended RET instruction transfers execution to the attacker-chosen return address on the stack and allows the attacker to retain execution control through the program code, and direct execution to the next set of chosen sequence of instructions to achieve the attacker's intent. The clusters of attacker-chosen instruction sequences are referred to as gadgets.

Often the executed gadget includes only several assembler instructions followed by a RET instruction that can already perform a well-defined attack operation. By chaining together a set of these gadgets such that the RET instructions from one gadget lands into the next gadget and so on, the malware writer is able to execute a complex algorithm without injecting any code into the program. Some of these instruction sequences ending in a RET can be found in functions compiled into the program or libraries.

Thus the ROP technique involves delivering a payload having a set of chained list of pointers to gadgets and parameters to a data memory of a program using vulnerabilities like stack buffer overflows. The exploit also overwrites the return address of the vulnerable function that was used to perform the stack buffer overflow to point to the first gadget in the sequence. When this vulnerable function executes a RET instruction, control transfers to the first gadget instead of the function caller. This gadget may then consume one or more data elements from the stack payload. Using this exploit type, the malware writer is able to change the control flow of the program by causing a control transfer to a non-programmer intended location in the program (e.g., to the middle of an instruction).

A ROP attack technique uses various characteristics of an x86 instruction set architecture (ISA): variable length and unaligned instruction encoding; large and dense ISA encoding; a stack holding control and data information; and a single byte opcode RET instruction. Current techniques to defend against such attacks may be ineffective and have various shortcomings.

DETAILED DESCRIPTION

Figure 1:
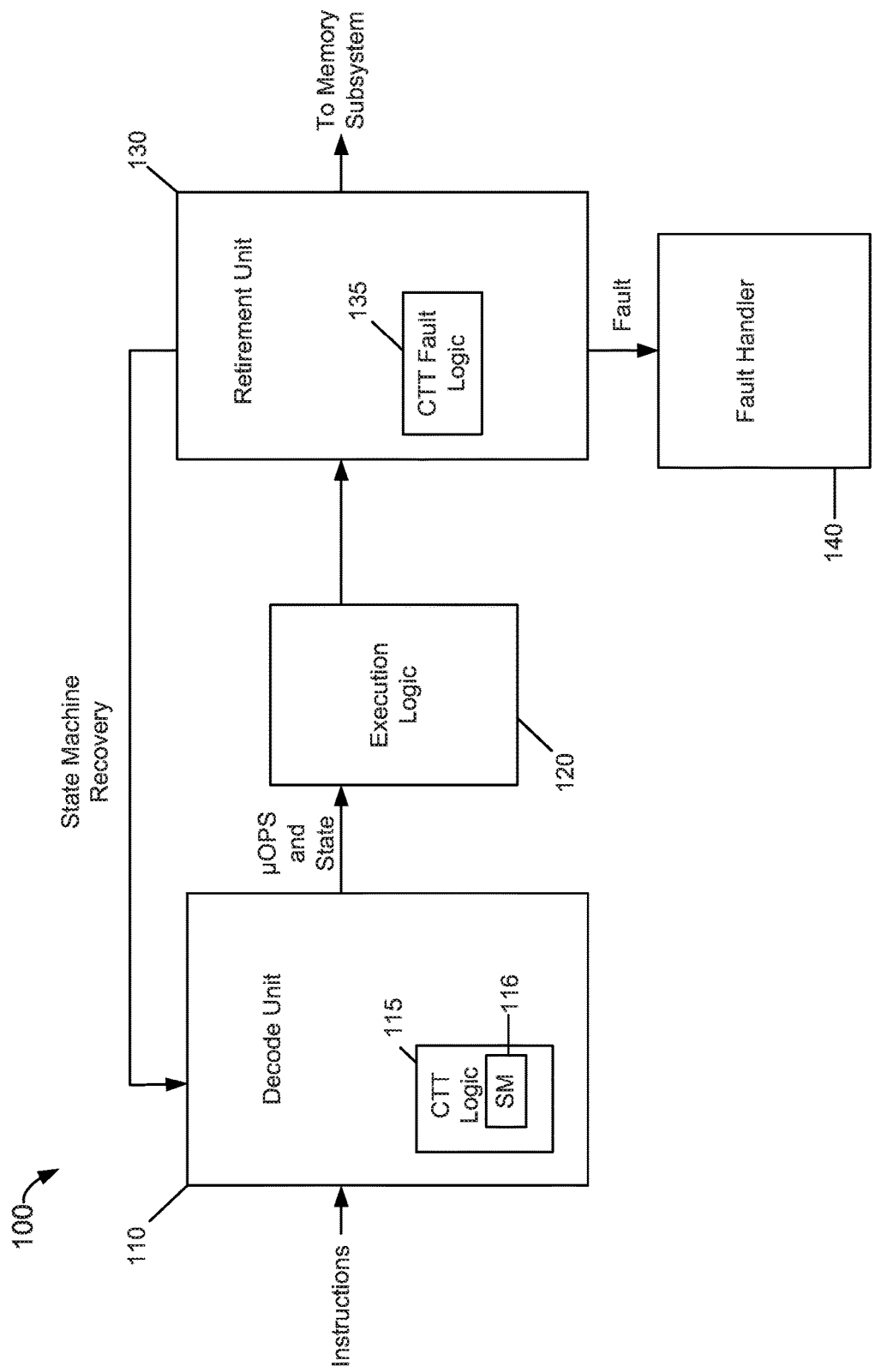
FIG. 1 is a block diagram of a portion of a processor in accordance with an embodiment of the present invention.

Embodiments provide a set of instruction set architecture (ISA) instructions that enable a processor to determine whether a control transfer instruction is directed to an appropriate target, and if not to take action to prevent instructions beyond the control transfer instruction from being committed to the architectural state of the processor. In this way, at least certain unintended control transfers within a program can be eliminated, constraining the number of gadgets that a malware writer can use.

More specifically, embodiments provide a set of control transfer termination (CTT) instructions to allow software to specify valid control transfer terminating points in a program such that hardware can enforce control transfers to occur to only programmer-intended locations. These CTT instructions perform this enforcement with minimal performance and energy impacts to the program. The CTT ISA extensions can thus mitigate the execution of unintended gadgets in programs.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the ISA may be implemented by one or more micro-architectures, which include processor logic and circuits used to implement one or more instruction sets. Accordingly, processors with different micro-architectures can share at least a portion of a common instruction set. For example, Intel® Pentium 4 processors, Intel® Core™, and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

In one embodiment, an instruction may include one or more instruction formats. Such instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

A first CTT instruction, referred to herein as an ENDBRANCH instruction, is used to identify valid locations in a program where a control transfer may be validly performed using an indirect CALL or an indirect jump (JMP) instruction. A second CTT instruction, referred to herein as an ENDRET instruction, is used to identify valid locations in a program where a control transfer may be validly performed using a RET instruction.

In an embodiment, these instructions have the following characteristics: they are 4 byte opcodes chosen such that they do not naturally occur in programs; and they are defined as no operation (NOP) currently in the x86 ISA to allow programs compiled with ENDBRANCH/ENDRET instructions to execute on earlier generation processors.

Although the scope of the present invention is not limited in this regard in an embodiment, these CTT instructions may have a general form that includes a multi-byte opcode. In one such implementation these CTT instructions may be represented by a four-byte opcode that corresponds to an opcode value not presently existing in the current x86 ISA. Beyond this opcode, there may be no additional encoding for the instruction, since the instruction executes as a no operation within an execution logic. As such there is no identification of a source operand, destination operand or immediate value to be associated with the instruction.

Referring now to FIG. 1, shown is a block diagram of a portion of a processor in accordance with an embodiment of the present invention. As shown in FIG. 1, portion 100 of the processor includes various portions of a pipelined processor such as an in-order or out-of-order processor. As seen, incoming instructions which may be macro-instructions of a given ISA are provided to a decode unit 110 that is configured to decode the instructions, e.g., into one or more smaller instruction such as micro-operations (μops).

As seen, decode unit 110 includes a CTT logic 115 in accordance with an embodiment of the present invention. In general, CTT logic 115 may analyze each incoming instruction and determine whether the instruction is associated with a control transfer. If so, CTT logic 115 may associate certain state information with one or more μops. This state indicates a state of a state machine 116 that is modified by decoding of at least certain control transfer and control transfer termination instructions. If instead the instruction is not associated with a control transfer, a different state may be associated with the one or more μops.

More specifically, when an incoming instruction is a control transfer instruction, a transition of state machine 116 within CTT logic 115 may occur to pass from an idle state to a given wait state. Furthermore, to reflect this wait state, a given encoding can be associated with the one or more μops decoded from the incoming control transfer instruction. If a next incoming instruction is a control transfer termination instruction that immediately follows the control transfer termination, then state machine 116 may return to the idle state and associate a given encoding with the decoded one or more μops. As will be discussed, if a control transfer instruction is not immediately followed by a control transfer termination instruction, CTT logic 115 may insert a fault μop into the processor pipeline (and the state machine may remain in a wait state).

Otherwise, if state machine 116 is in an idle state and an incoming instruction does not relate to a control transfer (or termination), an encoding of idle state information may be associated with the one or more μops to indicate that state machine 116 remains in the idle state.

Thus as seen in FIG. 1, decode unit 110 outputs a stream of μops and associated state information to indicate a state of state machine 116 within CTT logic 115. These μops and state information may be provided to an execution logic 120, which can include various types of units including arithmetic logic units (ALUs), floating point units and so forth that thus execute operations indicated by the stream of μops. In an embodiment, the CTT instructions only control the state transitions in state machine 200, and in an execution logic of the processor these instructions execute as NOP and do not cause any change in the program semantics.

In turn, results of the μops are provided to a retirement unit 130 configured to determine whether given operations were successfully performed and to retire them if so, and otherwise to raise a fault or exception if an undesired condition occurs as a result of the execution. In an out-of-order processor, retirement unit 130 may further operate to reorder instructions which may be executed in any order, back into program order. When instructions properly retire, they may be provided to further portions of a processor such as a memory sub system.

As further seen in FIG. 1, retirement unit 130 includes a CTT fault logic 135 which may be configured to determine whether appropriate behavior occurs with regard to control transfer instructions. More specifically, CTT fault logic 135 may operate to raise a fault when a given control transfer instruction to be retired is not directly followed by an appropriate control transfer termination instruction, as described herein. In an embodiment, this determination may be based at least in part on an inserted fault μop and the state information communicated with the μops exiting from decode unit 110. If a CTT fault μop is detected, a fault is raised and is communicated to a fault handler 140, which may take various actions in accordance with a given handler to resolve the faulting behavior. Thus in an embodiment, when a next instruction presented to retire after a control transfer instruction is not an appropriate CTT instruction, retirement unit 140 may deliver a fault responsive to this CTT fault μop by delivering a fault-class exception (e.g., a general protection fault) such that that instruction does not retire.

Still referring to FIG. 1, in the case where a misprediction occurs and instructions are to be re-executed according to a correct branch, retirement unit 130 may communicate via a feedback path with decode unit 110 to thus provide an indication of a proper branch or other code flow to be taken. Still further, via this feedback path a state machine recovery signal can be communicated such that state machine 116 of CTT logic 115 can be placed into an appropriate state to reflect this change in program flow. Stated another way, when a fault μop is present in a mispredicted path, a fault is not raised due to this misprediction and accordingly the state machine recovery signal may cause state machine 116 to pass from a wait state back to an idle state or a wait state, and to also indicate the last successful instruction to retire, so that decode unit 110 can decode instructions of the correct branch. Although shown at this high level in the embodiment of FIG. 1, understand the scope of the present invention is not limited in this regard.

Figure 2:
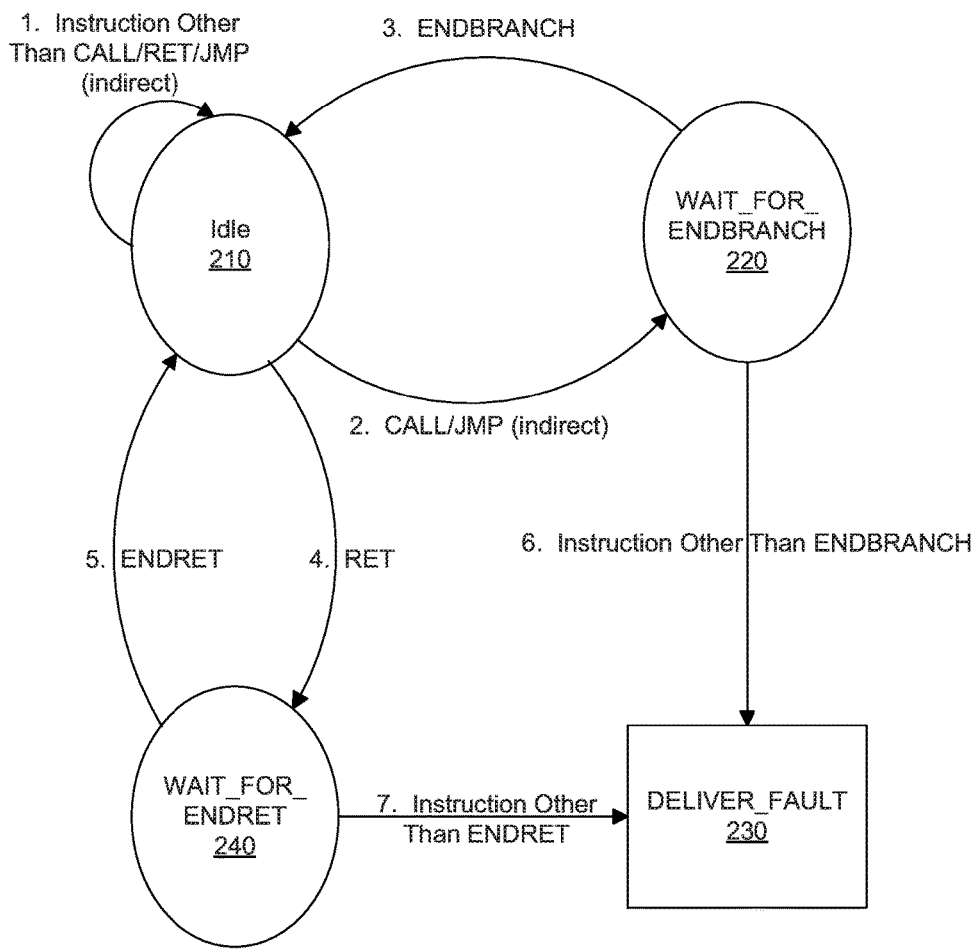
FIG. 2 is a block diagram of a state machine in accordance with an embodiment of the present invention.

Referring now to FIG. 2, shown is a block diagram of a state machine in accordance with an embodiment of the present invention. As shown in FIG. 2, state machine 200 may correspond to CTT state machine 116 of FIG. 1. State machine 200 begins operation in an IDLE state 210 into which the state machine is placed after reset of a processor.

When an indirect CALL or JMP instruction is decoded, the state machine enters the WAIT_FOR_ENDBRANCH state 220. If the next instruction that is decoded is not an ENDBRANCH instruction, then state machine 200 performs a DELIVER_FAULT operation 230 which causes generation of a fault μop (and state machine 200 may remain in the WAIT_FOR_ENDBRANCH state 220). If instead the next instruction to be decoded following a control transfer instruction is an ENDBRANCH instruction, state machine 200 transitions back to the IDLE state 210.

When a RET instruction is decoded, state machine 200 enters the WAIT_FOR_ENDRET state 240. If the next instruction that is decoded is not an ENDRET instruction, state machine 200 performs the DELIVER_FAULT operation 230. If the next instruction that is decoded is an ENDRET instruction, state machine 200 transitions back to the IDLE state 210.

Interrupts/exceptions/traps and VM exits that occur when state machine 200 is in the WAIT_FOR_ENDBRANCH or WAIT_FOR_ENDRET states cause a transition of the state machine to the IDLE state instead of the DELIVER_FAULT state (not shown for ease of illustration in FIG. 2). This is so, as the fault delivered due to the target of the indirect CALL, JMP or RET is higher priority than any faults caused by the target instruction itself (e.g., #NM, #GP due to various conditions like alignment checks, canonical checks, etc.) or any VM exits caused due to the target instruction being a VM exiting instruction (e.g., exiting on XGETBV, CPUID, etc.). This operation ensures that these asynchronous events do not cause unintended exceptions. Because these events are asynchronous to normal program execution, an attacker cannot realistically force them to be delivered after the CALL, JMP or RET, and thus they are not an effective way for an attacker to bypass the ROP security.

Enabling CTT additionally has the following effects, in an embodiment: interrupt returns (IRET) are disallowed and undefined (#UD) in a user level (e.g., ring 3) to prevent their use for building ROP gadgets; a pop to flags register instruction (POPF) does not update the trap flag (TF) bit in the system flags when executed at ring 3, which prevents an attacker from causing a #DB deterministically by using a POPFs instructions RET gadget, because exception will transition the state machine to the IDLE state.

State machine 200 thus enforces the following rules: the instruction at the target of a RET instruction must be an ENDRET instruction and the instruction at the target of an indirect CALL or indirect JMP instruction must be an ENDBRANCH instruction. If these rules are violated, then the violating instruction (the instruction at the target of a RET or CALL/JMP instructions) faults and is prevented from retiring.

Thus by placing ENDBRANCH and ENDRET instructions in a program at valid control transfer locations, a programmer or compiler can prevent unintended control transfers from happening. This placement of ENDBRANCH and ENDRET instructions is as illustrated below in Table 1, as an example:

TABLE 1

```
main( ) {
  int (*f)( );
  f = foo;
  f( );
}
int foo( ) {
  return
}
0000000000400513 <main>:
endbranch
push %rbp
mov %rsp,%rbp
sub $0x10, %rsp
movq $0x4004fb, -8(%rbp)
mov -8(%rbp), %rdx
mov $0x0, %eax
call *%rdx
endret
leaveq
retq
00000000004004fb <foo>:
endbranch
push %rbp
mov %rsp,%rbp
leaveq
retq
```

In this example, an ENDBRANCH instruction is placed as the first instruction in the subroutine foo and in the main program. And an ENDRET instruction is placed after the CALL instruction to subroutine foo. Thus there are now 3 valid control transfer points in this program. Specifically, in execution of the main program, a call instruction (call *%rdx) is executed, causing a control transfer to the subroutine foo. More specifically as seen, the first instruction in this subroutine is an ENDBRANCH instruction, such that a valid control transfer occurs and the CTT state machine thus proceeds from an IDLE state, to a WAIT_FOR_ENDBRANCH state and back to the IDLE state, without raising a fault.

Similarly, at the conclusion of the subroutine foo, a return instruction (RETQ) is executed, thus causing control to transfer to the first instruction after the calling instruction in the main program. Here, this instruction is an ENDRET instruction and as such, a valid control transfer occurs. In this case, the CTT state machine proceeds from the IDLE state, to the WAIT_FOR_ENDRET state, and thereafter back to the IDLE state, without raising a fault.

Thus using CTT in accordance with an embodiment of the present invention, a constraint is introduced that a ROP gadget be preceded with an ENDRET to be usable. As such, a significant reduction in the number of gadgets that can be harvested from a library is realized, and the quality of such gadgets is significantly lower in terms of functionality that these remaining gadgets expose, making ROP attacks harder to execute.

Figure 3A:
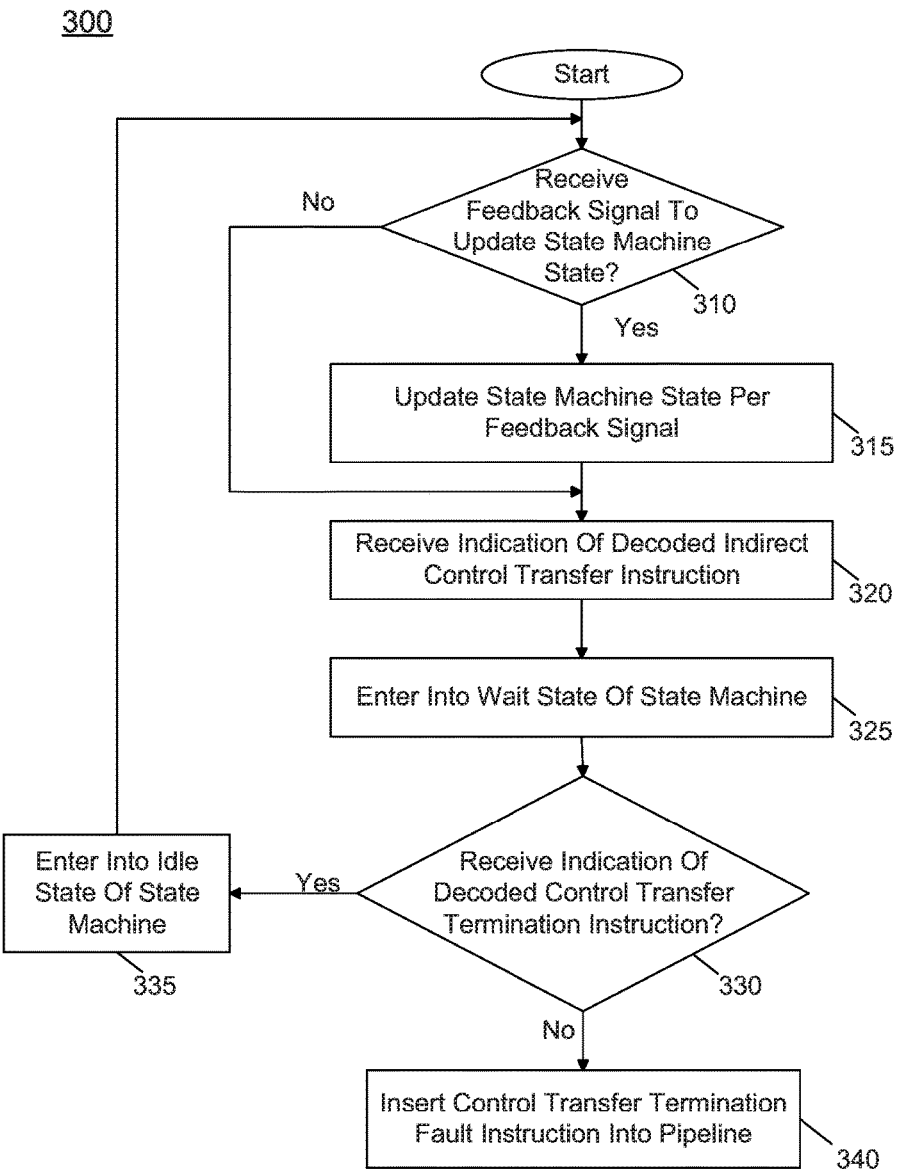
FIG. 3A is a flow diagram of a method in accordance with an embodiment of the present invention.

Referring now to FIG. 3A, shown is a flow diagram of a method in accordance with an embodiment of the present invention. As shown, method 300 may be performed by front end logic including a CTT state machine as described herein. Note that the operations shown in FIG. 3A relate to state machine operations for control transfer-related instructions. For other instructions, if the state machine is currently in the idle state, it remains there. As seen, method 300 begins by determining whether a feedback signal is received to update the CTT state machine (diamond 310). In an embodiment, this feedback signal may be received from a retirement unit or fault handler to cause the state of the state machine to transition to a given state, e.g., due to a misprediction (as from a retirement unit) or responsive to resolving a fault (as from a fault handler). If such feedback signal was received, control passes to block 315 where the state machine is updated with the state communicated through this feedback signal.

From both of these cases, control passes next to block 320 where an indication that an indirect control transfer instruction such as a call, jump or return has occurred (assuming that the decode unit has decoded such an instruction). And as such, control passes to block 325 where a transition into a wait state of the state machine may occur.

Still referring to FIG. 3A, control next passes to diamond 330 where it can be determined whether an indication of receipt of a control transfer termination instruction is received. If so, control passes to block 335 where the idle state of the state machine be entered, as pursuant to this proper CTT instruction following the control transfer instruction a valid control transfer occurs.

If instead it is determined that next decoded instruction is not a control transfer termination instruction, control passes to block 340 where a control transfer termination fault instruction can be inserted into the processor pipeline. Note here that the state of the state machine does not change and thus remains in the selected wait state. In an embodiment, this fault instruction is a μop that travels through the processor pipeline and if it is selected for retirement, the retirement unit will cause a fault to enable an OS-based fault handler to execute to determine the cause of the fault and take appropriate action.

Figure 3B:
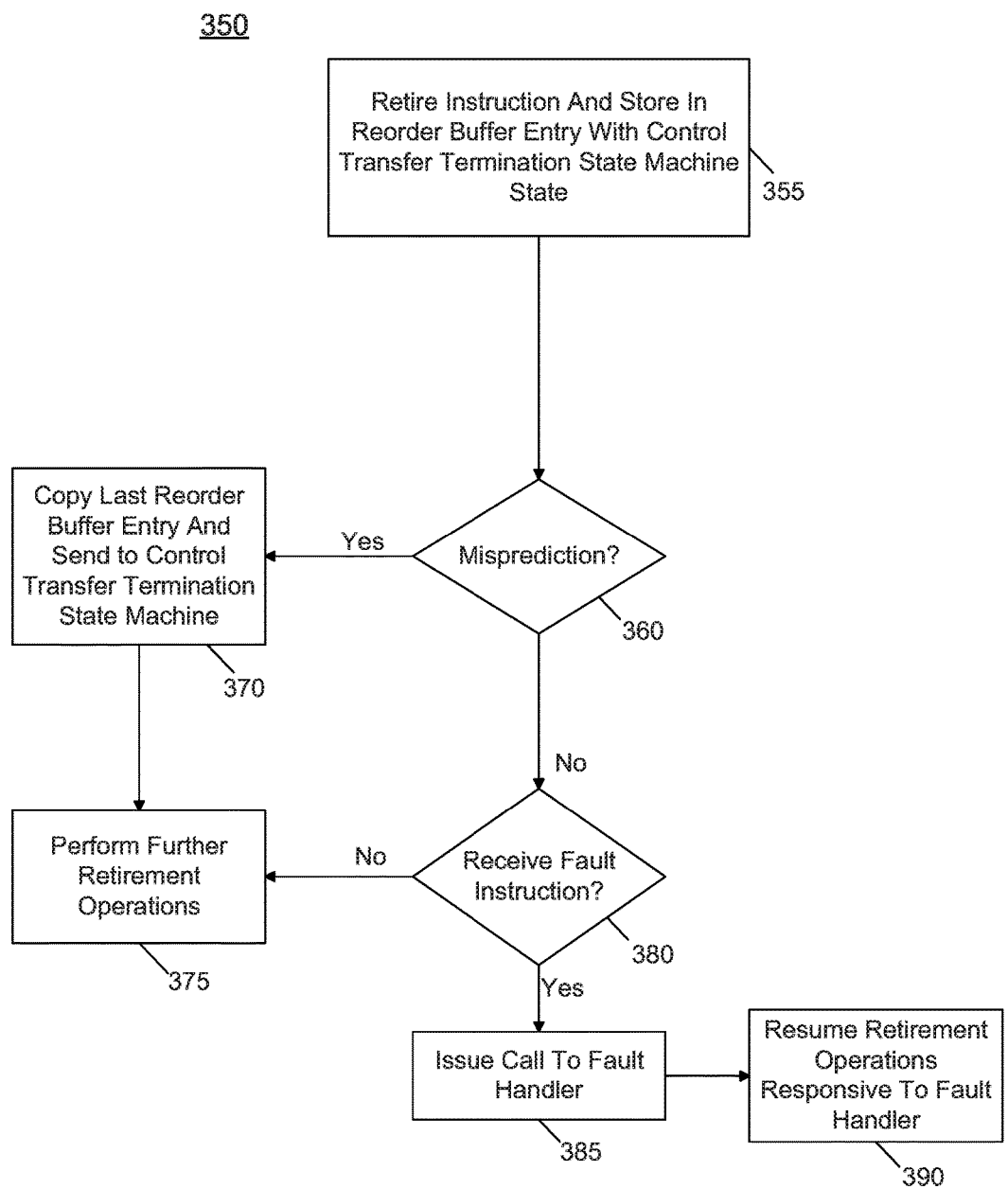
FIG. 3B is a flow diagram of another method in accordance with an embodiment of the present invention.

FIG. 3B is a flow diagram of another method in accordance with an embodiment of the present invention. Method 350 may be performed at least in part by logic of a retirement unit to handle CTT-based retirement operations. As seen, method 350 begins by retiring a given instruction and storing CTT state associated with the instruction (block 355). In an embodiment, this information may be stored in a given storage of the retirement unit such as reorder buffer entry. As will be discussed further below, this state can be used in case a misprediction occurs. Next control passes to diamond 360 to determine whether a misprediction has occurred. If so, control passes to block 370 where information regarding the last validly retired instruction present in an entry of the reorder buffer can be obtained and sent back to CTT logic (of the decode unit) to enable updating the state of the state machine into the appropriate state. There further typical retirement operations may continue (at block 375).

Referring still to FIG. 3B, if a fault instruction is received (diamond 380), control passes to block 385 where a call can be issued to a fault handler. As an example, an OS-based fault handler may be executed. As part of this fault handling when the fault is due to a CTT fault μop, a supervisor-based CTT state machine may be enabled and used to access the state of the user mode CTT state machine to determine the reason for fault and to act accordingly. As an example, a target instruction (namely a non-CTT target instruction) may be prevented from retiring and an appropriate correction mechanism may be performed. Or the fault handler may take any other action. As part of such operations, the fault handler may cause the user mode CTT state machine to be set to the appropriate state.

As further shown in FIG. 3B, after completion of the fault handler, retirement operations can be resumed responsive to control of the fault handler (block 390). Although shown at this high level in the embodiment of FIG. 3B is to be understood that the scope of the present invention is not limited in this regard.

With CTT instructions enforcing valid control transfer locations, software checks can be placed after these instructions to further check for valid control transfers using techniques like stack canaries. For the example discussed above, reference is made to Table 2:

TABLE 2

```
main( ) {
   foo( );
   endret;
   <detour/hook to anti-malware code to perform branch sanity check>
   ...
}
int foo( ) {
   return
}
```

In the example above there is thus one place in the program (after the ENDRET) where such a check is to be placed. Without CTT, software cannot effectively check all places that can be used as gadgets as these gadgets can be crafted out of byte sequences in the middle of valid instructions.

The instrumentation of a program using CTT instructions may be performed by a compiler. In an embodiment, a just-in-time (JIT) compiler may perform the instrumentation of the CTT instructions. Alternately such instrumentation can be performed by rewriting the program binary to insert the CTT instructions using a binary rewriting tool that reconstructs the control flow graph from the application binary. The binary rewriting technique can be used in cases where the source of the binary is not available for recompilation. Such binary rewriting may also be done by anti-malware software using such tools.

In some cases, applications and libraries compiled with CTT instrumentation may be merged with libraries that are not compiled with CTT instrumentation, such non-CTT instrumented libraries referred to herein as "legacy libraries."

To support interworking with these legacy libraries, embodiments may provide additional instructions. In one such embodiment, a suppression instruction, referred to herein as a DISCTT instruction, is used to suppress the CTT state machine such that it stays in the IDLE state instead of transitioning to the WAIT_FOR_ENDBRANCH or WAIT_FOR_ENDRET states on an indirect CALL/JMP or RET, respectively. Additionally this instruction returns into a general purpose register the state of the CTT suppression at the time the instruction was issued. An enable instruction, referred to herein as an ENCTT instruction, is used to remove the suppression of the CTT state machine put in place by the DISCTT instruction such that the state machine enforces the CTT rules. Additionally this instruction returns the state of the CTT suppression at the time the instruction was issued.

The use of DISCTT and ENCTT instructions may be enabled for a process by an operating system. If the operating system does not allow a program to disable CTT, then the DISCTT instruction executes as a NOP and does not suppress CTT.

The use of the DISCTT and ENCTT instructions in a program to perform legacy interworking is illustrated below in Table 3:

TABLE 3

```
// Issue a DISCTT before invoking a legacy library function foo( )
temp_variable = DISCTT;
foo( );
// If CTT was suppressed by DISCTT prior to this legacy library
call then un-suppress it
IF (temp_variable == NOT_SUPPRESSED)
    ENCTT;
ENDIF
```

Returning the previous state of CTT as a result of the DISCTT instruction allows for supporting call chains like below:

CTT_function1->legacy_function1->CTT_function2->legacy_function2

Here the CTT_function1 issues a DISCTT instruction before calling the legacy_function1. The DISCTT instruction returns the current state of CTT functionality as NOT_SUPPRESSED and then suppresses the CTT functionality. The legacy_function1 calls the CTT_function2. Now when the CTT_function2 calls legacy_function2, it again issues a DISCTT instruction. The DISCTT instruction now returns the current state of the CTT functionality as SUPPRESSED since it has been suppressed by CTT_function1. When the control returns from legacy_function2 to CTT_function2, it does not un-suppress the CTT functionality since it was already suppressed when it was invoked. When the control returns to CTT_function1, it un-suppresses the CTT functionality using the ENCTT instruction since it was suppressed by that function.

Returning the previous state of CTT responsive to the ENCTT instruction allows for a CTT-enabled library function to be called by a non-CTT enabled library/application to un-suppress CTT before it starts executing and suppress CTT before returning to the caller, if it was suppressed when the function was called.

This is as illustrated below in Table 4:

TABLE 4

```
Legacy_function1( )
{
  CTT function1( );
}
CTT_function1( )
{
  //ENDBRANCH is a NOP if this function was called with CTT
  suppressed/disabled ENDBRANCH;
  // Un-suppress CTT. If already unsuppressed this is gratuitous
  temp_variable = ENCTT;
  ....
  ....
  ....
  // If CTT was suppressed when this function was called the suppress
  // it before returning
  IF ( temp_variable == SUPPRESSED)
      DISCTT;
  ENDIF
  RET;
}
```

Figure 4:
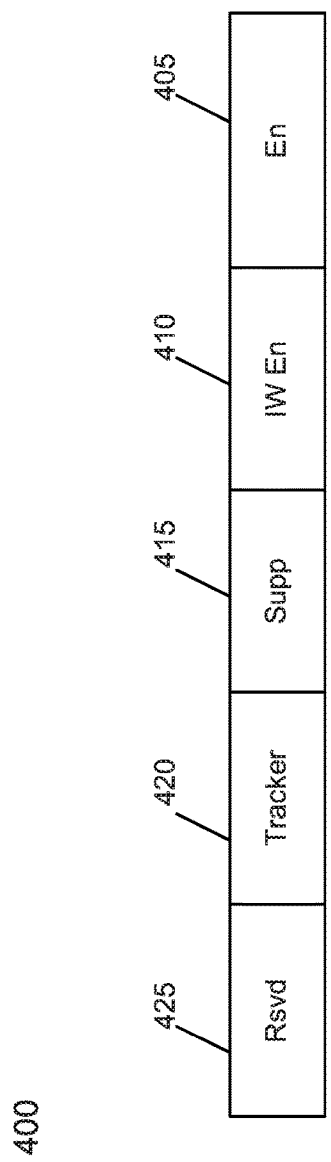
FIG. 4 is a block diagram of a configuration register in accordance with an embodiment of the present invention.

Referring now to FIG. 4, shown is a block diagram of a configuration register to store CTT state in accordance with an embodiment of the present invention. As shown in FIG. 4, configuration register 400 may include various fields to store state values used in performing CTT functionality. In an embodiment, two such configuration registers may be provided, with each register associated with a particular mode of operation. Stated another way, one configuration register may be used to control CTT operation in a user mode (e.g., ring 3) while a second configuration register may be used to control CTT functionality in a supervisor mode (e.g., rings less than 3).

In the embodiment shown, configuration register 400 includes an enable field 405 to store an enable indicator to indicate whether CTT is enabled for the current privilege level. A legacy enable field 410 is used to store an indicator to indicate whether legacy interworking is enabled. A suppression field 415 is used to store a suppression indicator to indicate whether CTT faults and tracking are to be suppressed. A tracker field 420 is used to store a value of the CTT state machine. In an embodiment, this tracker field may be two bits where a value of 0 indicates the IDLE state, a value of 1 indicates the WAIT_FOR_ENDRET state, and a value of 2 indicates the WAIT_FOR_ENDBRANCH state. A reserved field 425 may be used for various extensions. Of course other fields may be present in other embodiments.

Figure 5:
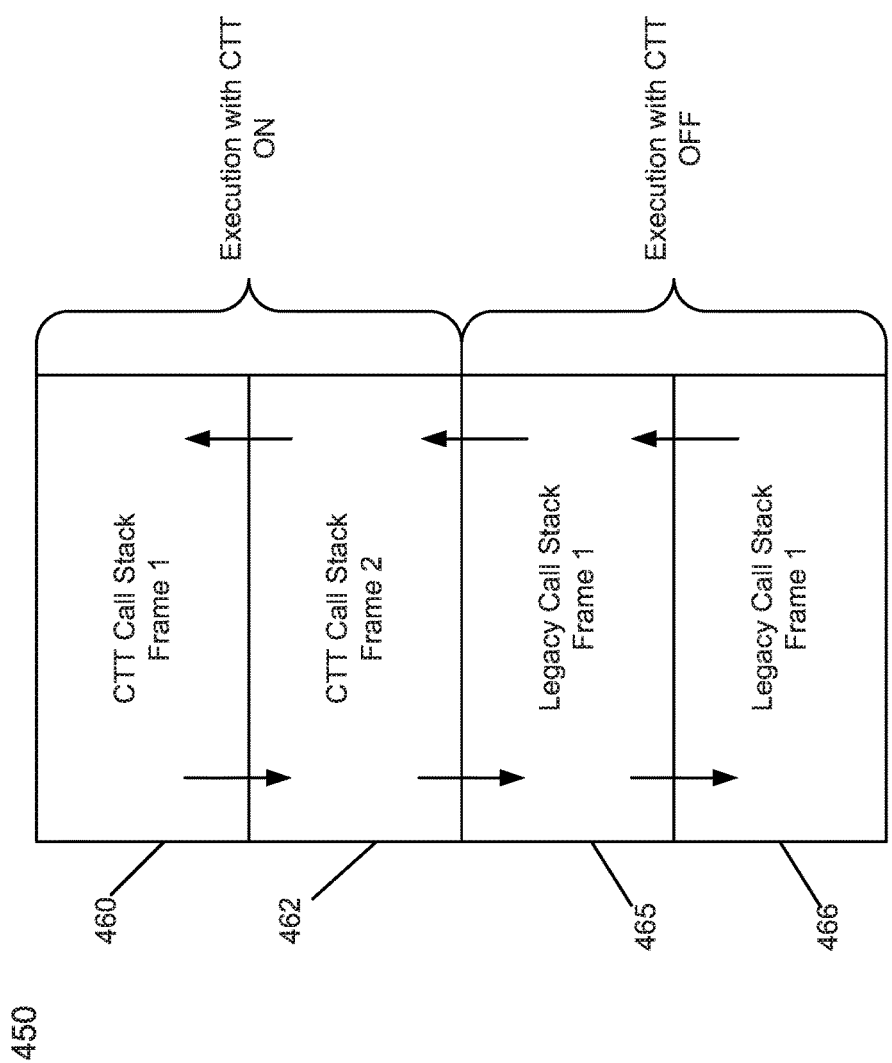
FIG. 5 is a block diagram of a call stack frame for code execution in accordance with an embodiment of the present invention.

Referring now to FIG. 5, shown is a block diagram of a call stack frame for code execution that interlaces CTT-enabled code and legacy code without CTT-enabled functionality. As shown in FIG. 5, a code segment 450 includes a first CTT call stack frame 460 and a second CTT call stack frame 462 that in turn calls a legacy call stack frame 465. Thus at the point of calling this legacy call stack frame, the CTT functionality is disabled responsive to a DISCTT instruction. Thus at this point execution begins with CTT functionality disabled for a first legacy call stack frame 465 and a second legacy call stack frame 466. Note that as the called functions return back, at the point of returning to call stack frame 462, execution with CTT functionality is re-enabled by an ENCTT instruction.

As such, FIG. 5 shows an example where a first transfer to legacy code suppresses CTT, which is done using indirect CALL/JMP instructions (not RET) for security reasons. Once CTT is suppressed by a DISCTT instruction, subsequent CALL/JMP/RET instructions can land on instructions other than ENDBRANCH/ENDRET without causing faults. CTT operation is unsuppressed when control returns to the point where suppression was done, via an ENCTT instruction.

Figure 6:
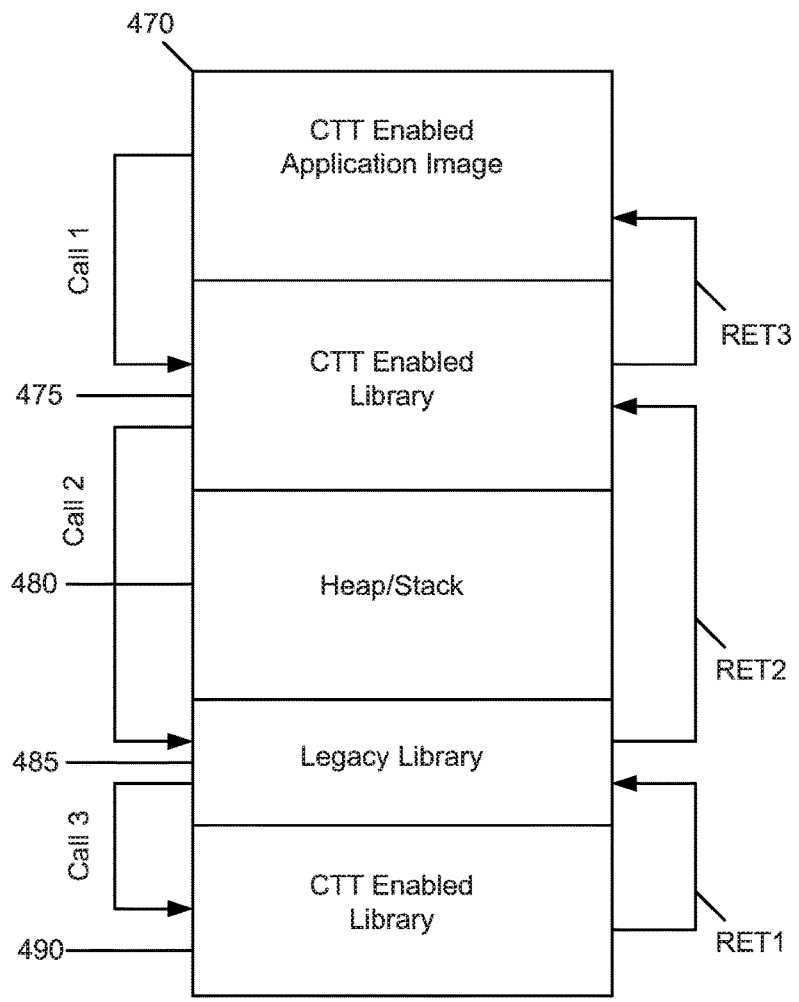
FIG. 6 is a block diagram of further details of legacy interworking in accordance with an embodiment of the present invention.

Referring now to FIG. 6, shown are further details of legacy interworking in accordance with an embodiment of the present invention. As shown in FIG. 6, an implementation is present with a CTT-enabled application image 470 that issues a call to a CTT enabled library 475 (Call1) that in turn initiates a call to a legacy library 485 (Call2). In turn, legacy library 485 issues a call to a second CTT-enabled library 490 (Call3). Also present is a heap/stack 480. After execution in second CTT-enabled library 490, control passes back to legacy library 485 (RET1), and from there control returns back to first CTT-enabled library 475 (RET2), and finally control returns back to application image 470 (RET3).

Note that upon Call2, a legacy transfer occurs and thus CTT is suppressed via a DISCTT instruction. Accordingly, for Call3, CTT remains suppressed, as it does for RET1. Finally, RET2 causes a return to the point of suppression and as such, CTT is unsuppressed via an ENCTT instruction. Note that this legacy interworking may be entered when a legacy interworking enable indicator of a CTT control logic is set and an indirect control transfer (namely a jump or call) occurs to a non-ENDBRANCH instruction.

The DISCTT and ENCTT instructions may be placed in the program by the programmer if she is aware of the interworking, and/or these DISCTT and ENCTT instructions may be placed in the program by the compiler/linker when it is linking statically to legacy libraries.

When linking dynamically to libraries, a loader or anti-malware software can insert trampoline functions between the application and the library, where the trampoline functions use DISCTT and ENCTT instructions. For example, calls to functions in a legacy library that are dynamically linked to a CTT enabled application go through a trampoline function, which suppresses CTT and then calls the legacy library function. The legacy library function returns to the trampoline function that un-suppresses CTT and returns to the CTT-enabled application.

Embodiments may be used by anti-malware software to wrap non-CTT binaries such that they can be used with CTT-enabled binaries. In addition, anti-malware software can restrict the use of the gadgets that can be found in the program even with CTT in use. Embodiments may be particularly applicable to mobile and other portable low power systems, in that software only techniques to mitigate against ROP (like rewriting binaries to remove all instances of RET by use of functionally equivalent but larger more complex sequences), generally lead to much larger binaries and increase the execution time of the program and thereby are not suited for mobile applications where power efficiency is a prime concern.

Figure 7:
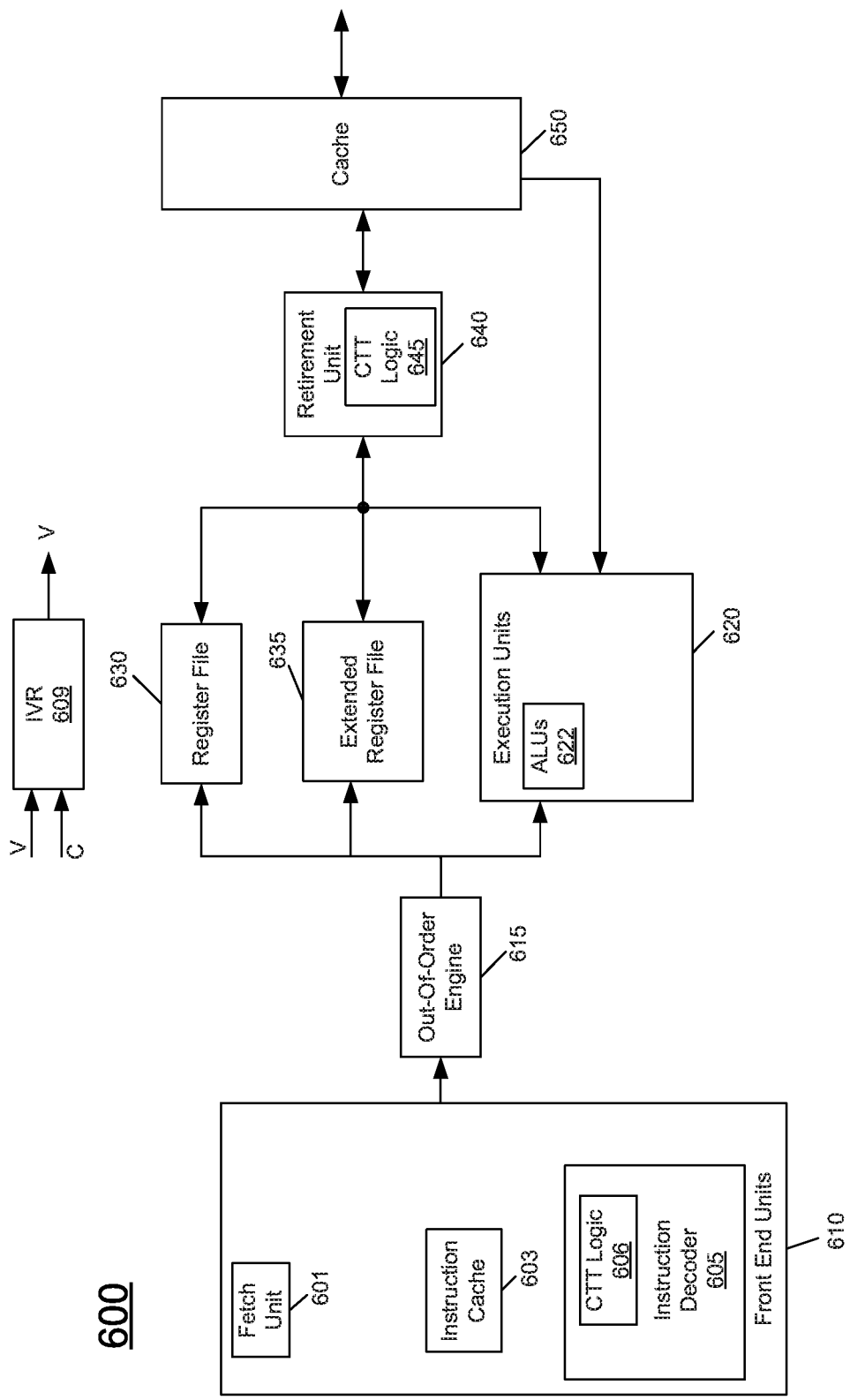
FIG. 7 is a block diagram of a processor core in accordance with one embodiment of the present invention.

Referring now to FIG. 7, shown is a block diagram of a processor core in accordance with one embodiment of the present invention. As shown in FIG. 7, processor core 600 may be a multi-stage pipelined out-of-order processor. Core 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 600 may be a general-purpose processor, such as a Core™ i3, i5, i7, 2 Duo and Quad, Xeon™, Itanium™, XScale™ or StrongARM™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

As shown in FIG. 7, core 600 may operate at various voltages and frequencies as a result of integrated voltage regulator 609. As seen in FIG. 7, core 600 includes front end units 610, which may be used to fetch instructions to be executed and prepare them for use later in the processor. For example, front end units 610 may include a fetch unit 601, an instruction cache 603, and an instruction decoder 605. Instruction decoder 605 includes CTT logic 606 in accordance with an embodiment of the present invention, with an associated CTT state machine to perform CTT operations as described herein. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to a retirement unit 640 including a reorder buffer (ROB). This ROB may include various arrays and logic to receive information associated with instructions that are executed. This information is then examined by retirement unit 640 to determine whether the instructions can be validly retired and result data committed to the architectural state of the processor, or whether one or more exceptions occurred that prevent a proper retirement of the instructions. Of course, retirement unit 640 may handle other operations associated with retirement. For retirement operations here, CTT logic 645 of the retirement unit may store CTT state machine state received with incoming instructions, and feedback this information responsive to a misprediction.

As shown in FIG. 7, retirement unit 640 is coupled to a cache 650 which in one embodiment may be a low level cache (e.g., an L1 cache), although the scope of the present invention is not limited in this regard. Also, execution units 620 can be directly coupled to cache 650. From cache 650, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of a ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
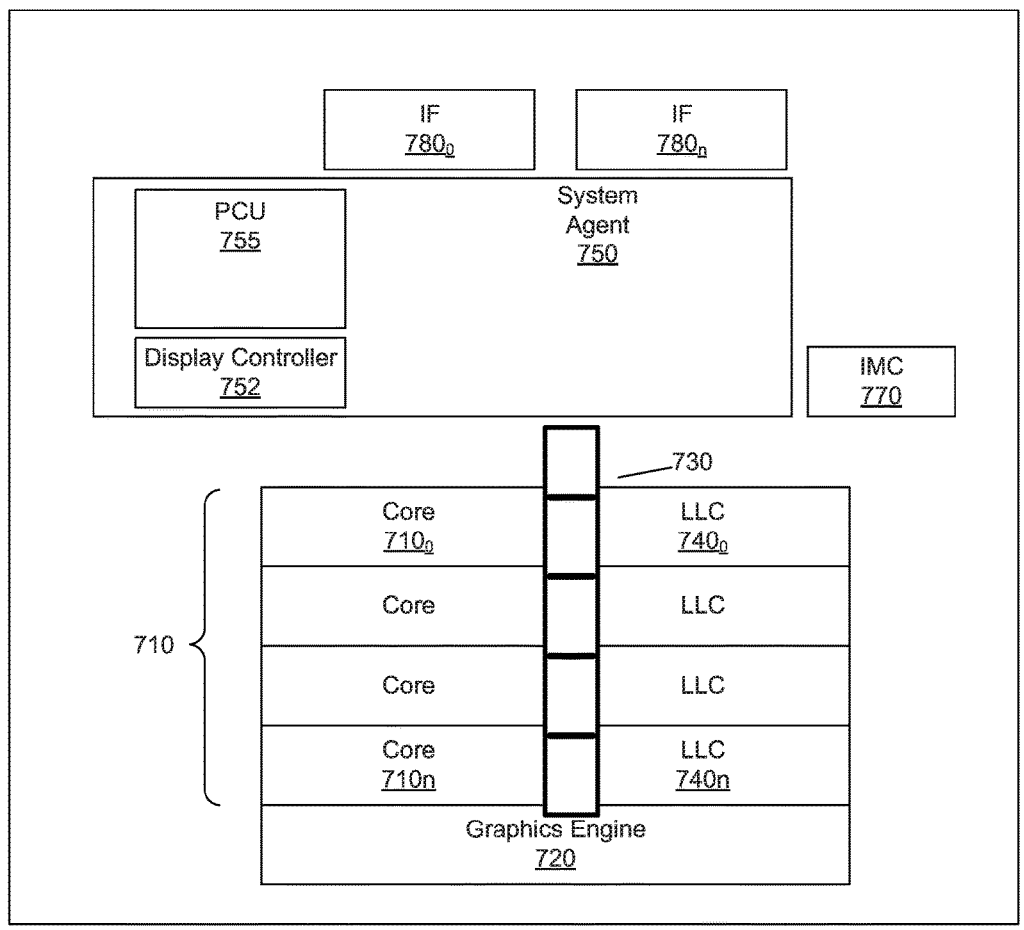
FIG. 8 is a block diagram of a multicore processor in accordance with an embodiment of the present invention.

Referring now to FIG. 8, shown is a block diagram of a multicore processor in accordance with an embodiment of the present invention. As shown in the embodiment of FIG. 8, processor 700 includes multiple domains. Specifically, a core domain 710 can include a plurality of cores 710$_0$-710$_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 710 may further include low level caches in addition to various execution units and additional processing elements, including CTT logic as described herein. In turn, the various cores may be coupled to each other and to a shared cache memory formed of a plurality of units of a last level cache (LLC) $740_0$-$740_n$. In various embodiments, LLC 740 may be shared amongst the cores and the graphics engine, as well as various media processing circuitry. As seen, a ring interconnect 730 thus couples the cores together, and provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755.

As further seen in FIG. 8, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 8, understand the scope of the present invention is not limited in this regard.

Figure 9:
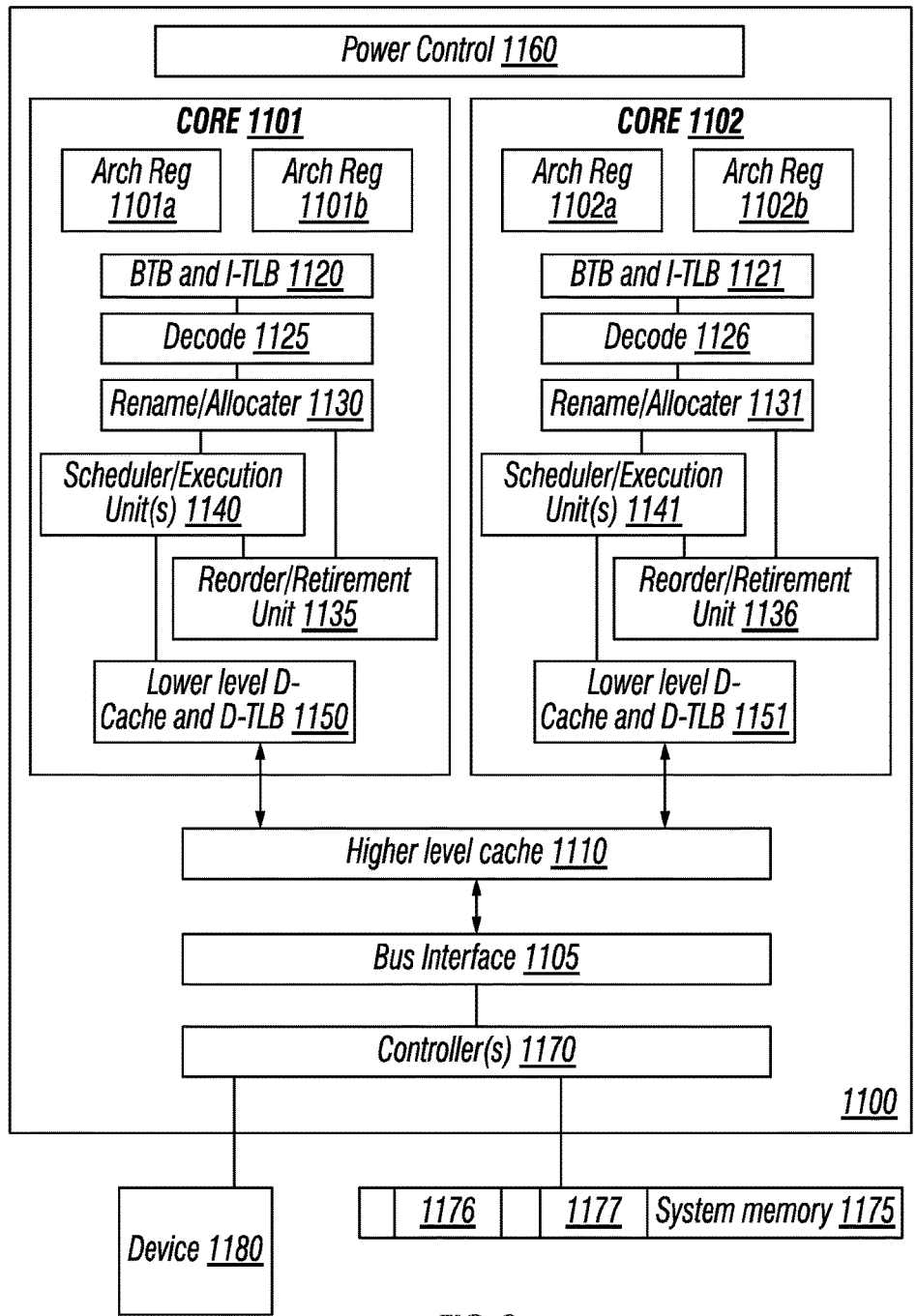
FIG. 9 is an embodiment of a processor including multiple cores in accordance with an embodiment of the present invention.

Referring to FIG. 9, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 9, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native ISA including CTT instructions as described herein, a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions including CTT instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 10:
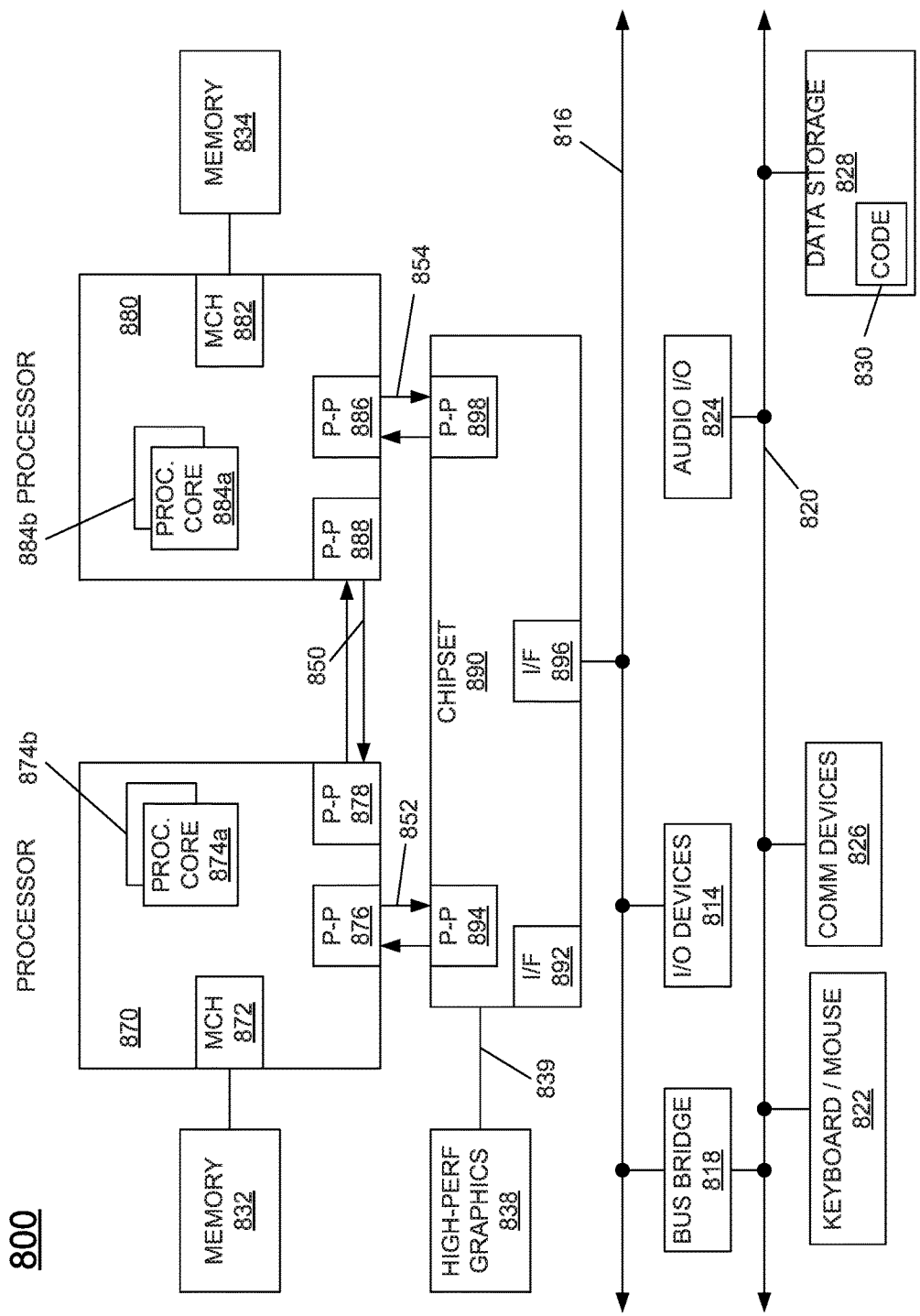
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 800 is a point-to-point interconnect system, and includes a first processor 870 and a second processor 880 coupled via a point-to-point interconnect 850. As shown in FIG. 10, each of processors 870 and 880 may be multicore processors, including first and second processor cores (i.e., processor cores 874*a* and 874*b* and processor cores 884*a* and 884*b*), although potentially many more cores may be present in the processors. Each of the processors can include CTT-based logic to defend against ROP and other security attacks using CTT instructions including user level and supervisor level instructions.

Still referring to FIG. 10, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 10, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 10, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 10, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
    a fetch unit to fetch instructions;
    a decode unit to decode the instructions, the decode unit including:
        a control transfer termination (CTT) logic to cause a CTT fault to be raised if a target instruction of an indirect control transfer instruction is not a CTT instruction, the CTT instruction having a multi-byte opcode and no further encoding, the decode unit to output the indirect control transfer instruction to an execution logic;
    the execution logic to execute the decoded instructions; and
    a retirement unit to raise the CTT fault after retirement of the CTT instruction.
2. The processor of claim 1, wherein the CTT logic further is to associate second state information with the indirect control transfer instruction.
3. The processor of claim 2, wherein the decode unit is to output the second state information to the execution logic.
4. The processor of claim 1, wherein the execution logic is to execute the CTT instruction as a no operation.
5. The processor of claim 1, wherein the decode unit is to decode a CTT suppression instruction to cause the CTT logic to remain in an idle state responsive to a control transfer instruction, to prevent the CTT fault from being raised.
6. The processor of claim 5, wherein the decode unit is further to decode a CTT suppression removal instruction to cause the CTT logic to transition to a wait state responsive to a control transfer instruction.
7. The processor of claim 1, wherein the CTT instruction comprises an ENDBRANCH instruction.
8. The processor of claim 1, wherein the indirect control transfer instruction comprises one of an indirect call instruction and an indirect jump instruction.
9. A method comprising:
    decoding, in a decoder of a processor, a control transfer instruction and a next instruction following the control transfer instruction, and updating a state of a control transfer termination (CTT) logic of the decoder based on the control transfer instruction;
    providing the control transfer instruction, the state of the CTT logic and the next instruction to a pipeline of the processor;
    providing, from the decoder, a fault micro-operation to the pipeline of the processor when the next instruction is not a control transfer termination (CTT) instruction;
    retiring the control transfer instruction in a retirement unit of the processor; and
    raising, via the retirement unit, a fault based at least in part on the fault micro-operation.
10. The method of claim 9, further comprising handling the fault and updating the state of the CTT logic.
11. The method of claim 10, further comprising transitioning the CTT logic into a wait state responsive to the control transfer instruction.
12. The method of claim 11, further comprising transitioning the CTT logic into an idle state responsive to the next instruction, wherein the next instruction is a CTT instruction.
13. A system comprising:
    a processor including a front end unit having a fetch unit to fetch instructions and a decode unit to decode the instructions, the decode unit including a control transfer termination (CTT) logic, responsive to a control transfer instruction, to decode the control transfer instruction into a decoded control transfer instruction and associate second state information with the decoded control transfer instruction to indicate that the CTT logic is in a wait state and provide the decoded control transfer instruction and the second state information to an execution logic, the execution logic coupled to the front end unit to execute instructions, and a retirement unit coupled to the execution logic, wherein the retirement unit is to raise a CTT fault based at least in part on the second state information when an instruction that follows a retired control transfer instruction is not a CTT instruction; and a system memory coupled to the processor.

14. The system of claim 13, wherein the system memory includes a program having an image, the image including a first control transfer instruction to call a first library, the first library having a second control transfer instruction to call a second library, wherein the first library is adapted to execute CTT instructions and the second library is not adapted to execute CTT instructions.

15. The system of claim 13, wherein the decode unit is to decode a CTT suppression instruction to cause the CTT logic to remain in an idle state responsive to a second control transfer instruction, to prevent the CTT fault from being raised if a target instruction of the second control transfer instruction is not a CTT instruction, and to thereafter decode a CTT suppression removal instruction to cause the CTT logic to transition to a wait state responsive to a third control transfer instruction.

16. The system of claim 15, wherein the processor further comprises a configuration register to store a CTT state including an enable field to enable the CTT logic and a suppression field to cause the CTT logic to remain in the idle state.

17. The system of claim 13, wherein the control transfer termination instruction comprises an ENDRET instruction and the control transfer instruction comprises a RETURN instruction.

18. The system of claim 13, wherein the processor comprises an out-of-order processor.

19. The system of claim 13, wherein the processor further comprises a feedback path coupled from the retirement unit to the decode unit.

20. The system of claim 19, wherein the decode unit is to update a state of the CTT logic in response to a state machine recovery signal sent from the retirement unit via the feedback path.

* * * * *